Figure 1:
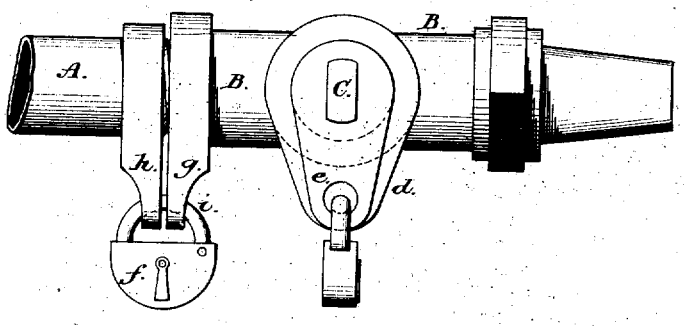

V. T. HALL, dec'd.

Henry C. Meyer & Co, Assignees of J. H. Morris, Executor.

LOCKING DEVICE FOR STOP-COCKS.

No. 7,598. Reissued April 10, 1877.

Witnesses;

Geo. H. Graham.

Jacob Kelbel

Henry C. Meyer & Co

Assignee of Valentine T. Hall dec'd by D. N. McPhee

Attorney.

UNITED STATES PATENT OFFICE.

HENRY C. MEYER & CO., OF NEW YORK, N. Y., ASSIGNEE OF JOHN H. MORRIS, EXECUTOR OF VALENTINE T. HALL, DECEASED.

IMPROVEMENT IN LOCKING DEVICES FOR STOP-COCKS.

Specification forming part of Letters Patent No. 89,929, dated May 11, 1869; reissue No. 7,598, dated April 10, 1877; application filed February 17, 1877.

*To all whom it may concern:*

Be it known that VALENTINE T. HALL, of Brooklyn, in the county of Kings and State of New York, did invent a new and useful Means of Locking Stop-Cocks, and locking together the stop-cock and the pipe or fitting to which it may be connected; and that the following is a full, clear, and exact description of said invention, reference being had to the accompanying drawings, forming part of this specification, and to the letters of reference marked thereon.

Previous to this invention a want had been felt for some means for the prevention of the operation of stop-cocks attached to gas, water, steam, and other pipes and apparatus, and for the prevention of the loosening or removal of either the cocks or the connections from such pipes, so that any improper or unauthorized use of the cock to surreptitiously use the gas, steam, or liquid to be drawn through it, or any loosening or removal of the cock or fittings connecting the parts of an apparatus, to either accidentally or intentionally permit a leakage or discharge of the gas, steam, or liquid could be effectually prevented. The need of some means for the accomplishment of the purpose mentioned had been most felt by gas companies, as without some such contrivance it was not only necessary, in cases of cutting off the supply of gas from consumers, to go to the expense of disconnecting and removing the meters, but there was no way to prevent a fraudulent use of the gas on the part of the consumer by disconnecting the ingress and egress pipes of the meter, and making a temporary connection around the meter, so that the latter would not register the gas consumed.

To overcome these difficulties and supply the want referred to, was the main object of this invention, which consisted in providing the parts of the apparatus that are capable of movement relatively to each other (either for the opening and closing of communication between such parts, or for the disconnection of such parts) with lugs, projections, or other devices, adapted to operate in conjunction with some sort of lock, to effect the effectual locking up or locking together of said parts, as will be presently more fully explained.

To enable those skilled in the art to make and use the invention made the subject of this application, the following description of the construction and operation thereof is given, making reference by letters to the accompanying drawing, in which—

Figure 2:
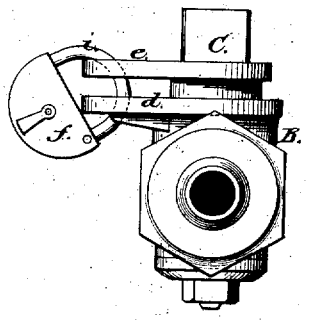

Figures 1 and 2 are elevations, showing from different points of view portions of an ordinary gas, steam, or liquid pipe, with a common stop-cock attached, and illustrating the application of the invention made the subject of this specification to the cock and also to the union or connection between the pipe and the cock fixture.

In the two figures the same parts will be found designated by the same letters of reference.

A is the part of a pipe, to which is connected, by the usual screw-thread joint, the shell portion B of an ordinary stop-cock, of which C is the key or cock portion proper. The shell B is provided, as clearly seen, with a projecting collar or lug, *d*, and the key or cock proper C is formed or provided with a projecting collar or lug, *e*. Each of the collars or lugs *d* and *e* has a hole in it, for the passage through it and accommodation of the link *i* of a padlock, *f*, whereby the said lugs may be securely locked and held in one relative position, as represented in the drawing, and the parts B and C thereby be locked in a given relative position to prevent operating the stop-cock.

The contrivance or combination of means or devices for effecting the locking or securement together of the separate portions of the apparatus, or for preventing the removal of the cock-fixture from the pipe-fixture, is substantially similar in principle of construction and operation to that already described for locking the parts of the stop-cock in a given relative position. It consists, as shown in the drawing, of a collar or flange, *g*, elongated on one side, with a hole in it, and formed on or permanently attached to the shell B, and a similar flange, collar, or lug, *h*, with which the pipe A is provided, by means of which and a lock the parts A and B may be effectually locked together by the insertion through the holes in collars *g h* of the link of a padlock, as clearly illustrated.

It will, of course, be understood that the shown form and detail construction of each or all of the several parts or devices, as well as the construction or kind of lock shown as employed, are not material to the invention, but may be varied according to circumstances, and in the judgment of the manufacturer or constructor of the fitting, and apparatus in connection with which it may be desired to use the invention, the gist of which rests in the use in combination with either the parts of the cock, or the parts of the connected fittings, of means or devices substantially such as shown and described, adapted to be locked together, and effect the retention, when so locked, of the parts which it is desired shall not be moved relatively, (either to bring them into operation or to separate them.)

It is not pretended that the invention herein described is analogous to a lock-cock, in which the cock is so constructed that its key and body portions interlock whenever the key is turned to cut off the supply, and in the use of which an auxiliary device or key must be employed before the cock can be again opened, and any such contrivance of a lock-cock is here disclaimed; but

What is claimed as new, and desired to be secured by Letters Patent, is—

The combination, with the two parts of a stop-cock, or with the cock and the pipe to which it is coupled or connected, of means, substantially as described, adapted to be fastened together by a lock, and which, when locked together, effectually prevent any rotation relatively of the parts with which said means is combined.

HENRY C. [illegible]YER & CO. [L. S.]

Signed and sealed in presence of—
J. N. McINTIRE,
JACOB FELBEL.